US009152459B2

United States Patent
Zhou et al.

(10) Patent No.: US 9,152,459 B2
(45) Date of Patent: Oct. 6, 2015

(54) ADJUSTING THREAD PRIORITY TO IMPROVE THROUGHPUT BETWEEN PEER-TO-PEER (P2P) DEVICES

(71) Applicant: Marvell World Trade Ltd., St. Michael (BB)

(72) Inventors: Qiao Zhou, Shanghai (CN); Xueming Zhao, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 277 days.

(21) Appl. No.: 13/868,939

(22) Filed: Apr. 23, 2013

(65) Prior Publication Data

US 2013/0283285 A1     Oct. 24, 2013

Related U.S. Application Data

(60) Provisional application No. 61/636,899, filed on Apr. 23, 2012.

(51) Int. Cl.
  *G06F 9/46* (2006.01)
  *G06F 9/48* (2006.01)
  *G06F 9/50* (2006.01)

(52) U.S. Cl.
  CPC ............ *G06F 9/4881* (2013.01); *G06F 9/5038* (2013.01)

(58) Field of Classification Search
  None
  See application file for complete search history.

(56) References Cited

U.S. PATENT DOCUMENTS

| 5,260,942 | A | 11/1993 | Auerbach et al. | |
|---|---|---|---|---|
| 7,900,207 | B2 * | 3/2011 | Nemirovsky et al. | 718/107 |
| 2007/0002742 | A1 | 1/2007 | Krishnaswamy et al. | |
| 2007/0073720 | A1 | 3/2007 | Clarke | |
| 2009/0067328 | A1 | 3/2009 | Morris et al. | |
| 2011/0116470 | A1 | 5/2011 | Arora et al. | |
| 2011/0317713 | A1 * | 12/2011 | Assarpour et al. | 370/412 |
| 2012/0076155 | A1 * | 3/2012 | Kounnas | 370/465 |

OTHER PUBLICATIONS

Yun, Lee Dong, International Search Report and the Written Opinion of the International Searching Authority, PCT Application No. PCT/US2013/037854, dated Aug. 12, 2013.
Scheduling Priorities (Windows), http://msdn.microsoft.com/en-us/library/windows/desktop/ms685100(v=vs.85).aspx[Mar. 19, 2013 12:27:55 PM], 5 pages.
Process and Thread Priorities, http://processpriority.com/[Mar. 19, 2013 12:25:38 PM], 9 pages.

\* cited by examiner

*Primary Examiner* — Kenneth Tang (57) ABSTRACT

In some implementations, a processor is configured to receive a current pending packet number representing a number of packets of data that currently remain to be transferred between two devices, determine whether to adjust a priority of a thread based on the current pending packet number, a previous pending packet number, and a priority pending packet number, and adjust or maintain the priority of the thread based on determining whether to adjust the priority of the thread. The thread is to be executed by the processor to perform a transfer of the packets of data between the two devices, the previous pending packet number represents a number of packets of data that previously remained to be transferred between the two devices, and the priority pending packet number corresponds to the current priority of the thread.

21 Claims, 10 Drawing Sheets

ADJUSTING THREAD PRIORITY TO IMPROVE THROUGHPUT BETWEEN PEER-TO-PEER (P2P) DEVICES

CROSS REFERENCE TO RELATED APPLICATION

This disclosure claims the benefit of priority under 35 U.S.C. §119(e) of U.S. Provisional Application No. 61/636,899, filed on Apr. 23, 2012, and titled "Algorithm for Self-Adaptively Adjusting Thread Priority to Improve Throughput between P2P Devices," the disclosure of which is hereby incorporated by reference in its entirety.

FIELD OF USE

The present disclosure relates to adjusting a thread priority, and specifically to adjusting a thread priority to improve throughput between peer-to-peer (P2P) devices.

BACKGROUND

Along with the rapid development of technology, devices with data transmission speeds of more than 100 Mbps can be implemented on modern processors. For high speed devices, thread scheduling may affect transmission throughput. In a system with a light workload, a thread may be scheduled such that the thread is executed at a minimum of every 30 μs. In a system with a higher workload, however, a thread may have to wait 100 μs or longer before being executed. The lowest priority threads may even have to wait an indefinite amount of time. To minimize the wait time, a thread may be assigned a higher priority. A thread assigned a high fixed priority, however, may preferentially occupy and use system resources even when the thread is idle, e.g., when the thread is not responding to a time-critical event.

For example, a system may include a high speed interface (HSI) that supports data, transmissions at a speed of more than 100 Mbps. The HSI may transfer 1250 bytes of a 1500-byte Transmission Control Protocol/Internet Protocol (TCP/IP) packet during a period of time for which the HSI is allocated system resources, e.g., a time slice. If the HSI has to wait more than 100 μs for its next time slice, the wait time may negatively impact the performance of the HSI. To minimize the wait time, a thread associated with the HSI may be assigned a higher priority. However, assigning a higher priority to a thread associated with the HSI may cause the HSI to preferentially occupy and use system resources even when the HSI is not performing a data transmission.

SUMMARY

The present disclosure describes systems and techniques relating to adjusting a thread priority to improve throughput between peer-to-peer (P2P) devices. In general, in one aspect, a processor is configured to receive a current pending packet number representing a number of packets of data that currently remain to be transferred between two devices, determine whether to adjust a priority of a thread based on the current pending packet number, a previous pending packet number, and a priority pending packet number, and adjust or maintain the priority of the thread based on determining whether to adjust the priority of the thread. The thread is to be executed by the processor to perform a transfer of the packets of data between the two devices, the previous pending packet number represents a number of packets of data that previously remained to be transferred between the two devices, and the priority pending packet number corresponds to the current priority of the thread.

The described systems and techniques can be implemented so as to realize one or more of the following advantages. When an amount of data waiting to be transferred between devices increases, transmission throughput between the devices may be improved by increasing the priority of the data transfer task so that data can be transferred at a faster rate. When the amount of data waiting to be transferred decreases, system workload may be balanced by decreasing the priority of the data transfer task so that other tasks may be scheduled while still meeting a minimum data transfer rate of the devices.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

Details of one or more implementations are set forth in the accompanying drawings and the description below. Other features, objects, and advantages may be apparent from the description and drawings, and from the claims.

DETAILED DESCRIPTION

Various implementations of the present disclosure are discussed below in conjunction with an example of a system that includes a high speed interface (HSI) through which data is transferred at a high speed, e.g., 100 Mbps or more, between peer-to-peer (P2P) devices. Examples of such systems may include routers, processors, memories, and other embedded systems. The systems and techniques described in this disclosure are generally applicable to any system in which it is desirable to adjust thread priority to improve data throughput and balance system workload. Accordingly, FIG. 1 corresponds to some implementations of a system capable of adjust thread priority, and other system implementations may include components different than those shown in FIG. 1.

Figure 1:
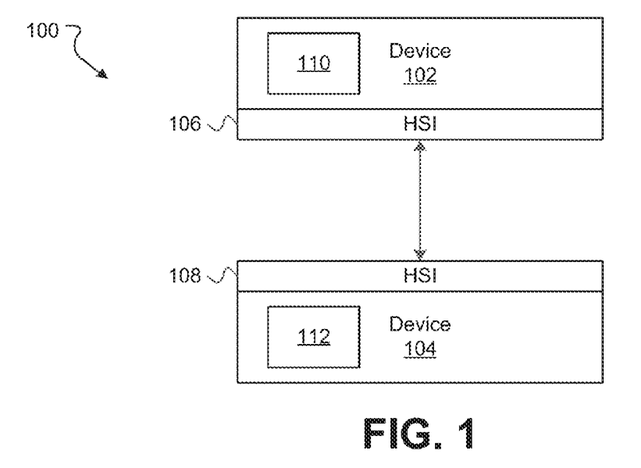
FIG. 1 is a block diagram showing an example of a system in which a thread priority may be adjusted to improve throughput between P2P devices.

FIG. 1 is a block diagram showing an example of a system 100 in which a thread priority may be adjusted to improve throughput between P2P devices 102 and 104. The P2P devices 102 and 104 may be, for example, an applications processor and a memory. The device 102 includes a processing core or a controller 110 and a HSI 106 through which the device 102 transmits and receives data at high speeds. The device 104 includes a processing core or controller 112 and a HSI 108 through which the device 104 transmits and receives data at high speeds.

Figure 2:
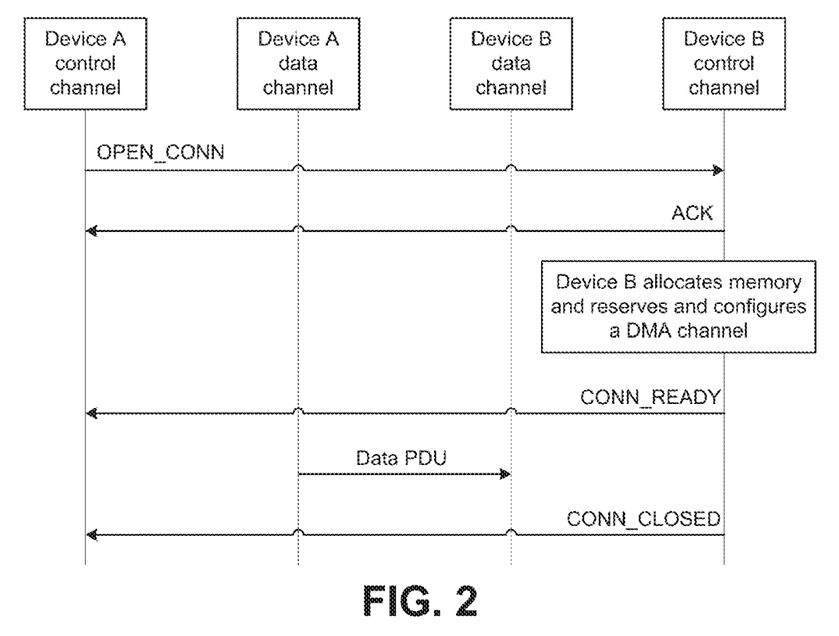
FIG. 2 is a signal diagram showing examples of signals exchanged between P2P devices to transfer data.

FIG. 2 is a signal diagram showing examples of signals exchanged between P2P devices to transfer data. Device A may be, for example, an applications processor. Device B may be, for example, a memory controller. Device A sends an open connection request signal OPEN_CONN to Device B through a control channel between Device A and Device B. The open connection request may be an event, an interrupt, or other suitable inter-process communication (IPC) protocol signal between P2P devices. In response to receiving the OPEN_CONN signal, Device B sends an acknowledgement signal ACK to Device A through the control channel. Device B may allocate, reserve, and configure resources, e.g., memory and dynamic memory access (DMA) channels, for the data transmission. Device B sends a connection ready signal CONN_READY to Device A through the control channel. The connection ready signal may be an event, an interrupt, or other suitable IPC protocol signal between P2P devices. In response to receiving the CON_READY signal, Device A sends data in a protocol data unit (PDU), e.g., a data packet, to Device B through a data channel. After receiving the data packet, Device B sends a connection closed signal CONN_CLOSED to Device A. Similar signals are exchanged between Device A and Device B for transmitting data from Device B to Device A.

Figure 3:
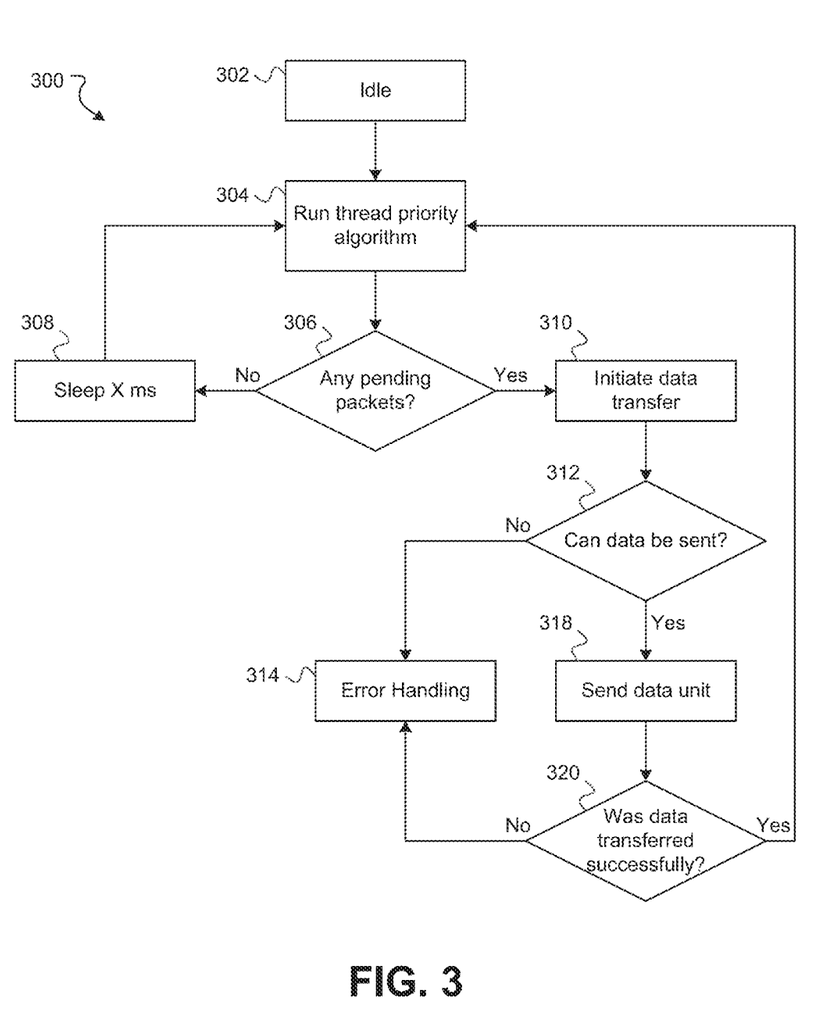
FIG. 3 is a flowchart showing examples of operations 300 performed by a processor executing a transmitter thread.

FIG. 3 is a flowchart showing examples of operations 300 performed by a processor executing a transmitter (TX) thread. The operations 300 may be performed by program code, hardware, or a combination of program code and hardware implemented in the processor.

At 302, the TX thread is idle, and no data is being transmitted to a peer device. At 304, the TX thread executes a thread priority algorithm, which will be discussed in detail later in this disclosure. At 306, the TX thread determines whether any pending packets, also referred to as suspension packets, remain to be transmitted to the peer device. If no pending packets remain, the TX thread sleeps for X milliseconds at 308, during which the TX thread is idle. In some implementations, the number of milliseconds X that the TX thread sleeps may be user-defined according to different software, hardware, or a combination of software and hardware configurations on a processor. In some implementations, the number of milliseconds X that the TX thread sleeps may be based on factors affecting performance of the system, such as sensitivity and power consumption.

If pending packets remain to be transmitted, the TX thread initiates a data transfer 310. For example, the TX thread may initiate a data transfer by sending an OPEN_CONN signal to the peer device.

At 312, the TX thread determines whether data can be sent. If the TX thread determines that data cannot be sent, the TX thread executes an error handling routine at 314. For example, the TX thread may determine that data can be sent after receiving an ACK signal and a CONN_READY signal. If an ACK signal or a CONN_READY signal is not received after corresponding time out periods, the TX thread executes the error handling routine.

After determining that data can be sent, the TX thread sends a data unit, e.g., a data packet, to the peer device at 318. The TX thread may be executed over one or more time slices until all data of the data packet is transmitted.

After transmitting the data packet, the TX thread determines whether the data was transferred successfully at 320. If the TX thread determines that the data was not transferred successfully, the TX thread executes the error handling routine at 314. For example, the TX thread may determine whether the data was transferred successfully by determining whether a CONN_CLOSED signal has been received. If a CONN_CLOSED signal is not received after a time out period, the TX thread executes the error handling routine. After determining that the data was transferred successfully, the TX thread executes the thread priority algorithm at 304.

Figure 4:
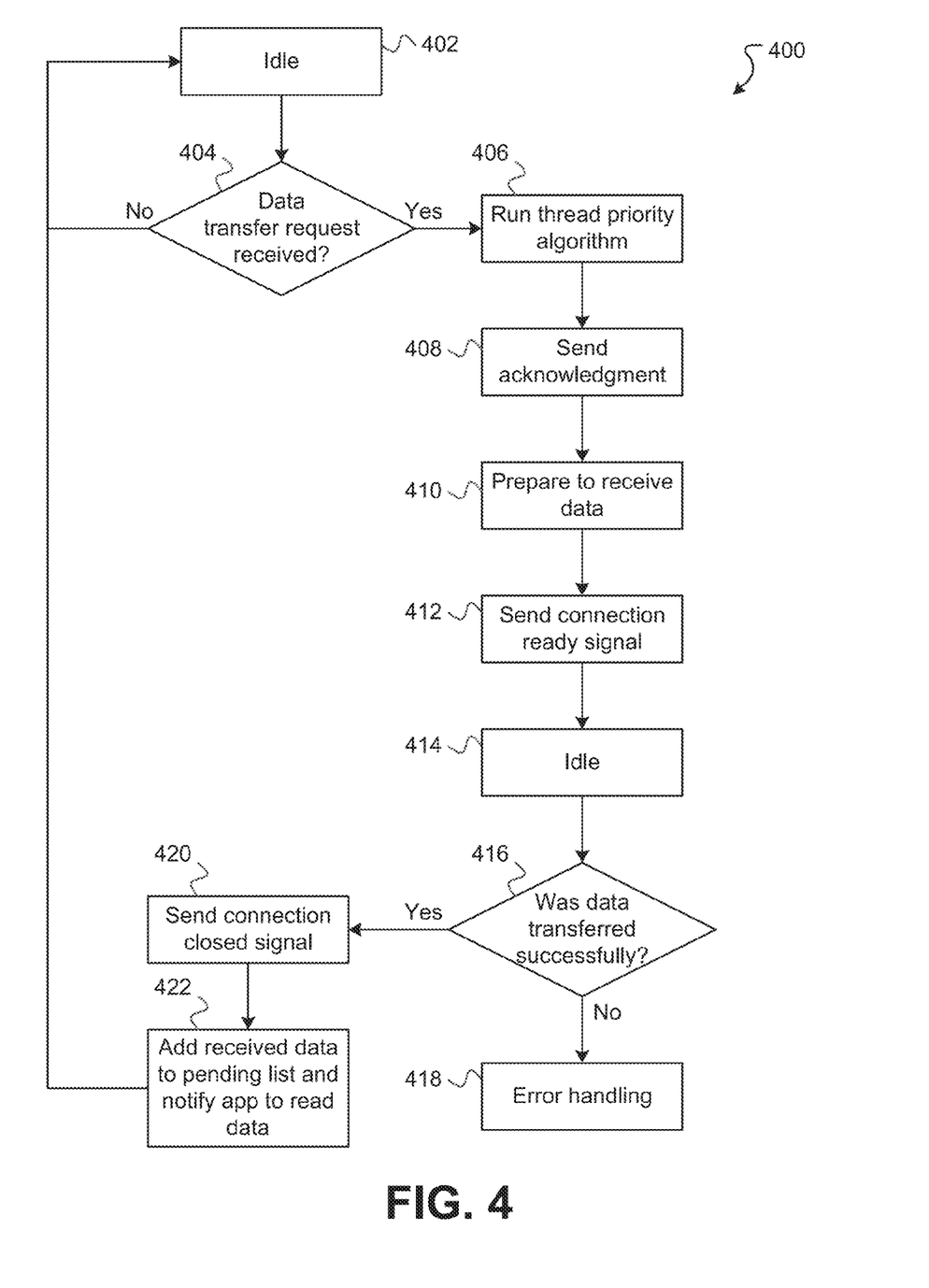
FIG. 4 is a flowchart showing examples of operations performed by a processor executing a receiver thread.

FIG. 4 is a flowchart showing examples of operations 400 performed by a processor executing a receiver (RX) thread. The operations 400 may be performed by program code, hardware, or a combination of program code and hardware implemented in the processor.

At 402, the RX thread is idle, and no data is being received from a peer device. At 404, the RX thread determines whether a data transfer request has been received. The data transfer request may be an event, an interrupt, or other suitable inter-process communication (IPC) protocol signal between P2P devices. For example, the RX thread may determine whether a data transfer request has been received by determining whether an OPEN_CONN signal has been received. If a data transfer request has not been received, the RX thread remains idle at 402. After receiving a data transfer request, the RX thread executes a thread priority algorithm at 406, which will be discussed in detail later in this disclosure.

At 408, the RX thread may optionally send an acknowledgment signal, e.g., an ACK signal, to the peer device to acknowledge receipt of the data transfer request. At 410, the RX thread may prepare to receive the data. For example, the RX thread may allocate memory and reserve and configure a dynamic memory access (DMA) channel for receiving the data. At 412, the RX thread sends a connection ready signal, e.g., a CONN_READY signal, to the peer device. The connection ready signal may be an event, an interrupt, or other suitable IPC protocol signal between P2P devices. At 414, the RX thread is idle while the data is being received.

At 416, the RX thread determines whether the data was transferred successfully. For example, the RX thread may determine whether the data was transferred successfully by determining whether a signal indicating that the data transfer has completed, e.g., a RX_DONE interrupt, has been received. If the RX thread determines that the data was not transferred successfully, the RX thread executes an error handling routine at 418. After determining that the data was transferred successfully, the RX thread sends a connection closed signal, e.g., a CONN_CLOSED signal, to the peer device at 420. At 422, the RX thread adds the received data to a list of pending data to be read by an application and notifies the application to read the data.

Figure 5:
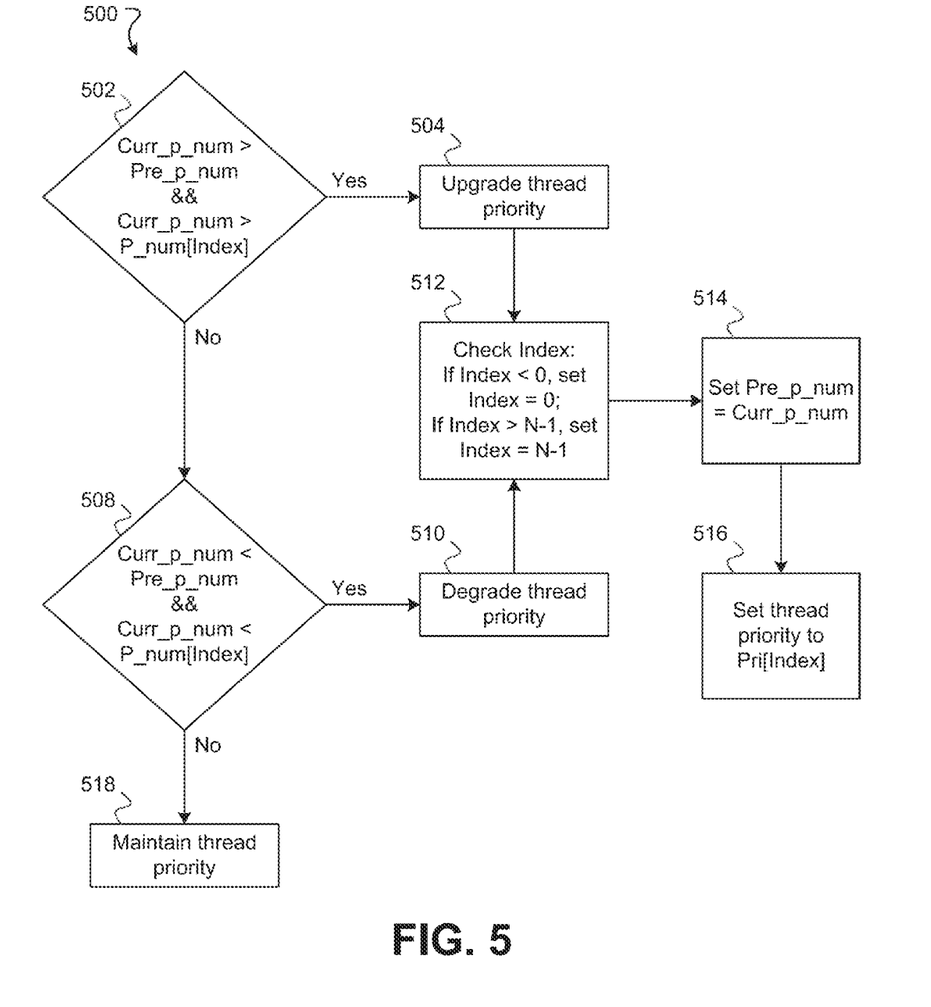
FIG. 5 is a flowchart showing examples of operations of a thread priority algorithm executed by a processor to adjust or maintain a priority of a thread that performs a data transfer.

FIG. 5 is a flowchart showing examples of operations 500 of a thread priority algorithm executed by a processor to adjust or maintain a priority of a thread that performs a data transfer. The parameters of the thread priority algorithm include a thread priority array, a priority pending packet number array, Index, a forward step Pre_f_step, a backward step Pre_b_step, a previous pending packet number Pre_p_num, and a current pending packet number Curr_p_num. The thread priority array has a size of N and the values Pri[ ]={pri_min, pri_1, . . . , pri_max}. The priority pending packet number array has a size of N and the values P_num[ ]={0, 1, . . . , num_max}. Index represents an index of the thread priority array and the pending packet number array. The forward step Pre_f_step represents an amount of adjustment to apply to the priority of the thread in the forward (upgrade) direction. The backward step Pre_b_step represents an amount of adjustment to apply to the priority of the thread in the backward (degrade) direction. The previous pending packet number Pre_p_num represents a number of packets of data that previously remained to be transferred between peer-to-peer devices. The current pending packet number Curr_p_num represents a number of packets of data that currently remain to be transferred between the peer-to-peer devices. When the thread priority algorithm is first initialized for a thread, Index, Pre_p_num, Pre_f_step, and Pre_b_step are set to 0. The current pending packet number Curr_p_num is an input parameter to the thread priority algorithm.

At 502, the processor determines whether the current pending packet number Curr_p_num is greater than the previous pending packet number Pre_p_num and whether the current pending packet number Curr_p_num is greater than a value of the priority pending packet number array specified by the index P_num[Index]. If Curr_p_num is greater than both Pre_p_num and P_num[Index], the processor performs operations to upgrade the thread priority at 504.

Figure 6:
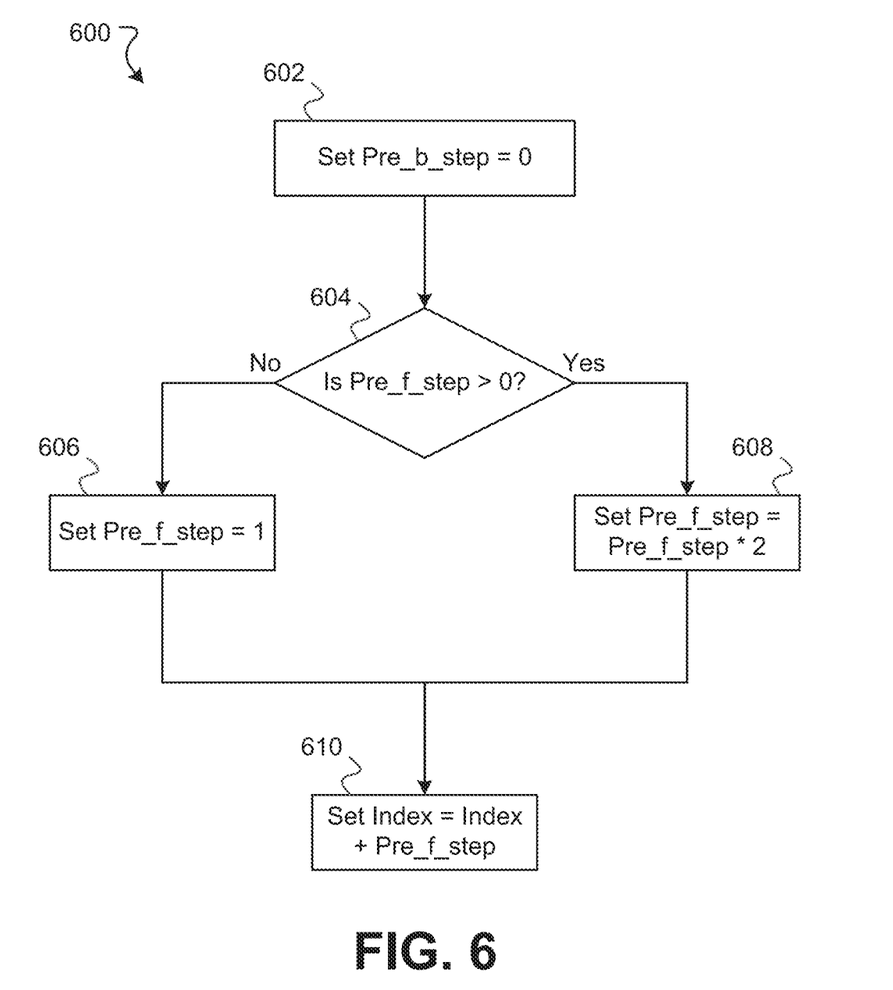
FIG. 6 is a flowchart showing examples of operations performed by a processor to upgrade a thread priority.

FIG. 6 is a flowchart showing examples of operations 600 performed by the processor to upgrade the thread priority. At 602, the processer sets the backward step Pre_b_step to 0 (Pre_b_step=0) to indicate that the priority is being upgraded. At 604, the processor determines whether the forward step Pre_f_step is greater than 0. If Pre_f_step is not greater than 0, the thread was not previously upgraded, and Pre_f_step is set to 1 (Pre_f_step=1) at 606. If Pre_f_step is greater than 0, the thread was previously upgraded, and Pre_f_step may be doubled (Pre_f_step=Pre_f_step*2) at 608. At 610, the processor increases the index by Pre_f_step (Index=Index+Pre_f_step).

Returning to FIG. 5, if Curr_p_num is not greater than both Pre_p_num and P_num[Index], the processor determines whether Curr_p_num is less than Pre_p_num and whether Curr_p_num is less than P_num[Index] at 508. If Curr_p_num is less than both Pre_p_num and P_num[Index], the processor performs operations to degrade the thread priority at 510.

Figure 7:
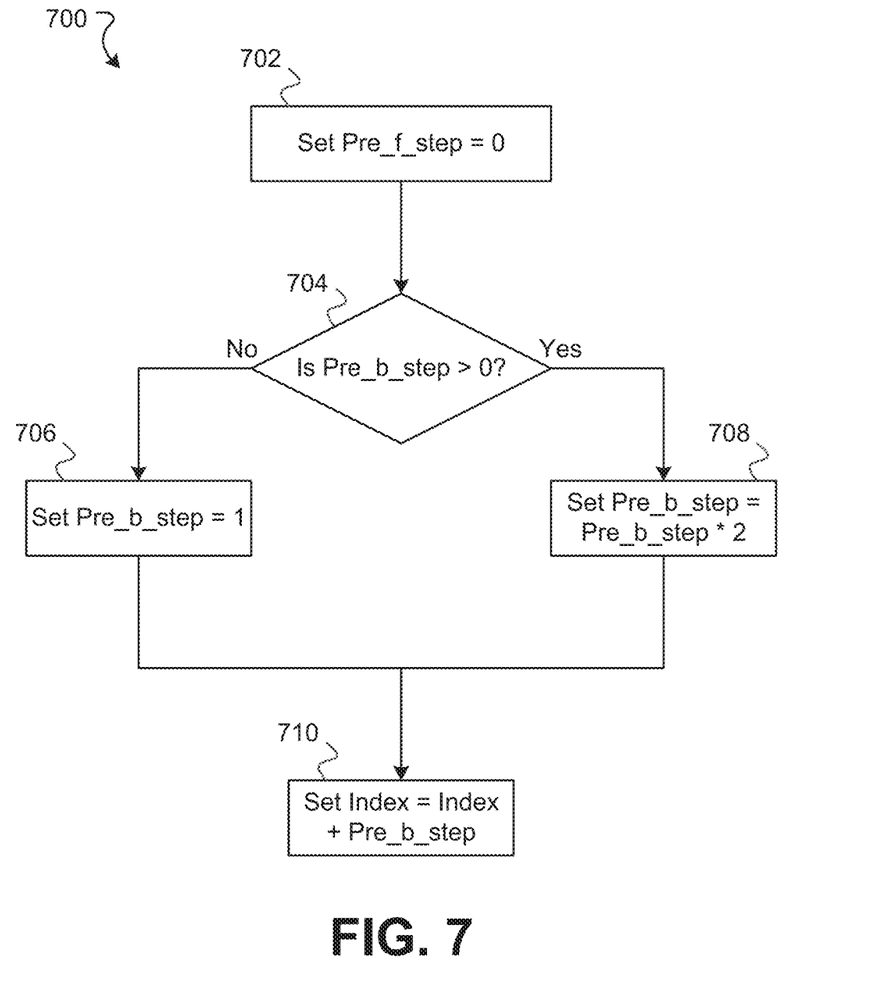
FIG. 7 is a flowchart showing examples of operations performed by a processor to degrade a thread priority.

FIG. 7 is a flowchart showing examples of operations 700 performed by the processor to degrade the thread priority. At 702, the processor sets the forward step Pre_f_step to 0 (Pre_f_step=0) to indicate that the priority is being degraded. At 704, the processor determines whether the backward step Pre_b_step is greater than 0. If Pre_b_step is not greater than 0, the thread was not previously degraded, and Pre_b_step is set to 1 (Pre_b_step=1) at 706. If Pre_b_step is greater than 0, the thread was previously degraded, and Pre_b_step may be doubled (Pre_b_step=Pre_b_step*2) at 708. At 710, the processor decreases the Index by Pre_b_step (Index=Index+Pre_b_step).

Returning to FIG. 5 at 512, after upgrading or degrading the thread priority, the processor determines whether the Index specifies a valid index of the thread priority array and the priority pending packet number array. If the index is less than 0 (index<0), the processor sets the index to 0 (index=0). If the index is greater than (index>N−1), the processor sets the index to N−1 (index N−1). At 514, the processor sets Pre_p_num to Curr_p_num (Pre_p_num=Curr_p_num). At 516, the processor sets the thread priority to Pri[index].

If the processor determines that Curr_p_num is not less than or greater than both Pre_p_num and P_num[index], the processor maintains the thread priority at 518.

Figure 8A:
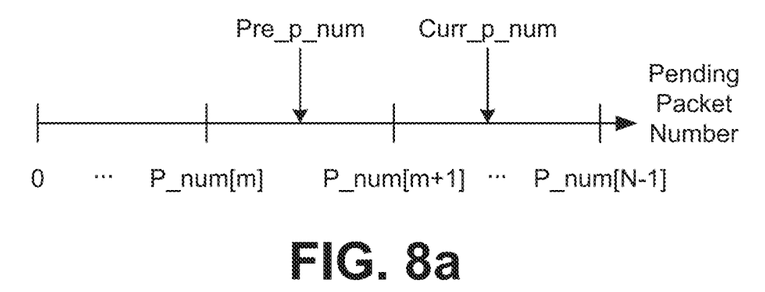
FIGS. 8a, 8b, 8c show charts that graphically depict examples of conditions for upgrading, degrading, or maintaining a thread priority.
Figure 8B:
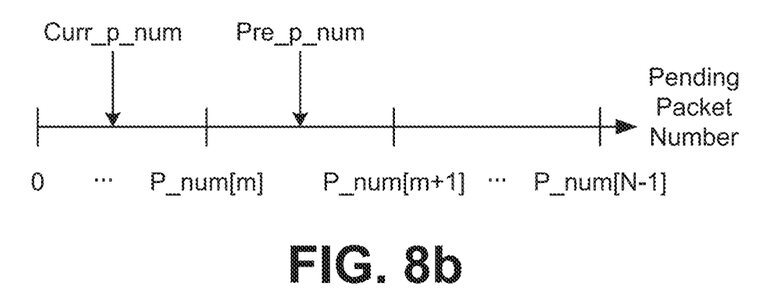
Figure 8C:
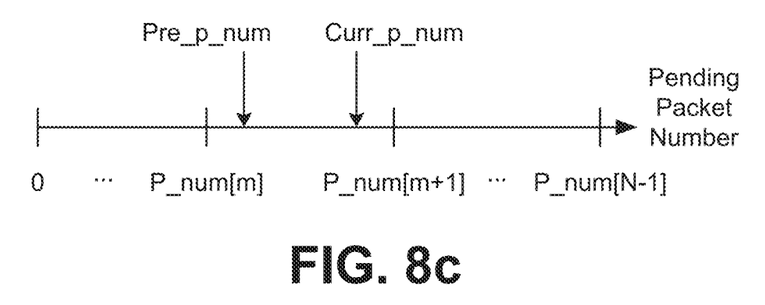

FIG. 8 shows charts that graphically depict examples of conditions for upgrading (FIG. 8a), degrading (FIG. 8b), or maintaining (FIG. 8c) a thread priority. In FIG. 8, the priority pending packet number increases as the index increases from 0 to N−1. As shown in FIG. 8a, a thread priority may be upgraded by raising the index from a level (or grade) m to a higher level (or grade) when Curr_p_num>P_num[m+1]>Pre_p_num. As shown in FIG. 8b, a thread priority in may be degraded by lowering the Index from a level m to a lower level when Curr_p_num<P_num[m]<Pre_p_num. As shown in FIG. 8c, a thread priority may be maintained by keeping the Index at a level m when P_num[m]<Curr_p_num≤P_num[m+1] and P_num[m]<Pre_p_num≤P_num[m+1].

Figure 9:
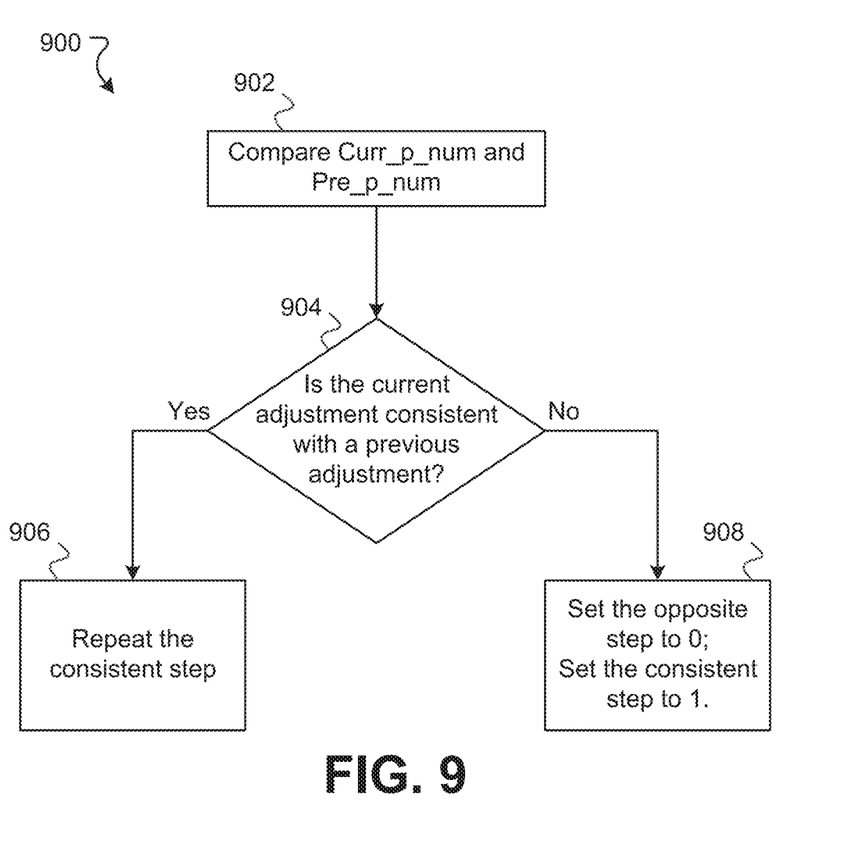
FIG. 9 is a flowchart showing examples of operations performed by a processor when adjusting a thread priority.

FIG. 9 is a flowchart showing examples of operations 900 performed by a processor when adjusting a thread priority. The processor may determine a priority step (e.g., the forward step Pre_f_step or the backward step Pre_b_step) based on whether the current adjustment is consistent with or opposite of a previous adjustment. When the current adjustment is in the same direction (either forward or backward) as a previous adjustment, the current adjustment is consistent with the previous adjustment. When the current adjustment is in the opposite direction as a previous adjustment (e.g., lowering a thread priority after previously raising the thread priority), the current adjustment is opposite of the previous adjustment.

At 902, the processor compares Curr_p_num and Pre_p_num. Based on the comparison, the processor determines whether the current adjustment is consistent with a previous adjustment at 904. For example, if the comparison of Curr_p_num and Pre_p_num indicates that Curr_p_num has increased after previously increasing, the current adjustment is consistent with the previous adjustment. Similarly, if the comparison of Curr_p_num and Pre_p_num indicates that Curr_p_num has decreased after previously decreasing, the current adjustment is consistent with the previous adjustment.

If the current adjustment is consistent with the previous adjustment, the processor may repeat the consistent step the forward step Pre_f_step or the backward step Pre_b_step) at 906. The processor may repeat the consistent step by repeating the adjustment or doubling the consistent step (e.g., as shown in 608 of FIGS. 6 and 708 of FIG. 7). Returning to FIG. 9, if the current adjustment is opposite of the previous adjustment, the processor sets the opposite step to 0 (e.g., as shown in 602 of FIGS. 6 and 702 of FIG. 7) and the consistent step to 1 (e.g., as shown in 606 of FIGS. 6 and 706 of FIG. 7) as shown in 908.

The thread priority array and the priority pending packet number array can be user-defined according to different software, hardware, or a combination of software and hardware configurations on a processor. The forward step Pre_f_step and the backward step Pre_b_step can be user-defined and may be other suitable values than the values described above.

For a TX thread, the current pending packet number Curr_p_num may represent a number of pending packets that currently remain to be transmitted between P2P devices. Different applications or user scenarios may have different requirements with respect to the data transmission rate. For example, when a data rate at which a memory can write data is faster than a data rate at which an HSI can transfer data, the current pending packet number may be higher. Before data packets are sent, the TX thread detects the current pending packet number and determines whether to adjust the priority. If the pending packet number is increasing, the priority of the TX thread is upgraded so that the TX thread can be scheduled quicker, thereby sending data at a higher data rate. If the pending packet number is decreasing, the priority of the TX thread is degraded so that the TX thread can be scheduled slower while still meeting any data rate requirements, thereby balancing the system workload.

For a RX thread, the current pending packet number Curr_p_num may represent a number of pending packets that currently remain to be read by a processor executing an application that requested the data. After receiving a data transfer request, the RX thread determines the current pending packet number and determines whether to adjust the priority. If the pending packet number is increasing, the priority of the RX thread is upgraded so that the RX thread can be scheduled quicker, thereby receiving data at a higher data rate. If the pending packet number is decreasing, the priority of the RX thread is degraded so that the RX thread can be scheduled slower while still meeting any data rate requirements, thereby balancing the system workload.

Figure 10:
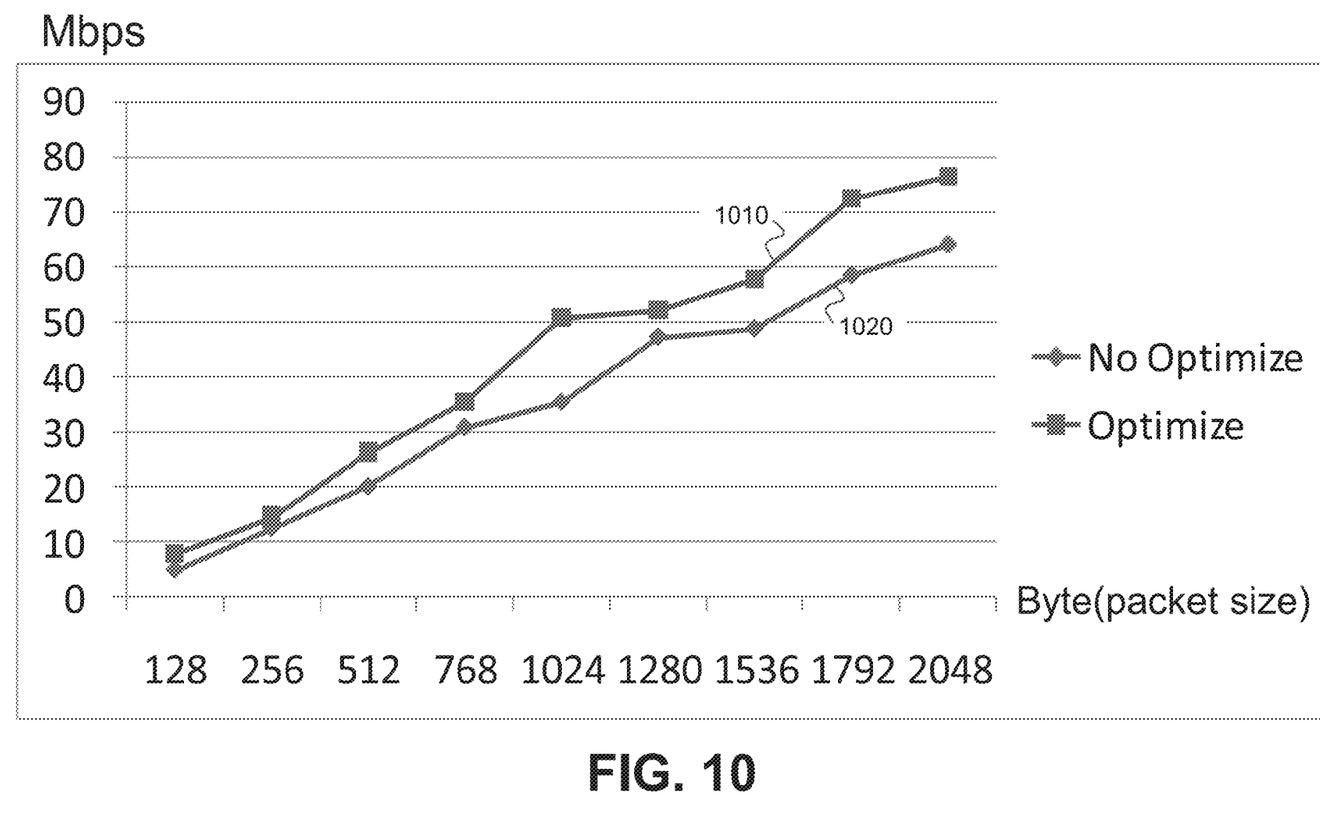
FIG. 10 is a graph showing examples of transmit data throughput rates in Mbps for different packet sizes in bytes.

FIG. 10 is a graph showing examples of transmit data throughput rates in Mbps for different packet sizes in bytes. Line 1010 represents a transmit data throughput rate for different packet sizes when a thread priority algorithm is utilized during transmission of data. Line 1020 represents a transmit data throughput rate for different packet sizes when a thread priority algorithm is not utilized during transmission of data.

Figure 11:
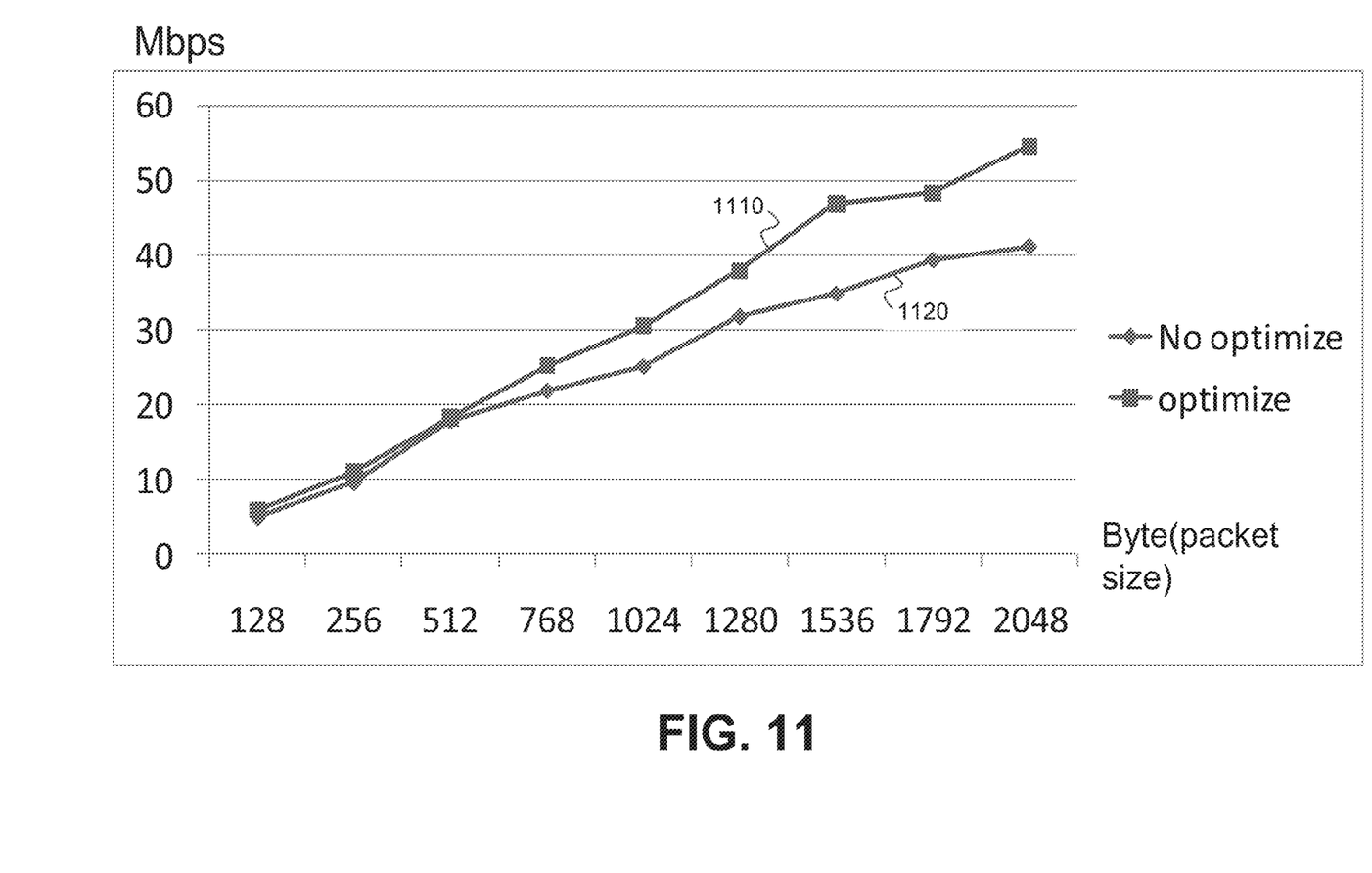
FIG. 11 is a graph showing examples of receive data throughput rates in Mbps for different packet sizes in bytes.

FIG. 11 is a graph showing examples of receive data throughput rates in Mbps for different packet sizes in bytes. Line 1110 represents a receive data throughput rate for different packet sizes when a thread priority algorithm is utilized during reception of data. Line 1120 represents a receive data throughput rate for different packet sizes when a thread priority algorithm is not utilized during reception of data.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including system on chip (SoC) implementations.

While this specification contains many specifics, these should not be construed as limitations on the scope of what may be claimed, but rather as descriptions of features that may be specific to particular embodiments. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations. Other implementations fall within the scope of the following claims.

What is claimed is:

1. A method, comprising:
receiving, by a processor, a current pending packet number representing a number of packets of data that currently remain to be transferred between two devices;
determining, by the processor, whether to adjust a priority of a thread based on the current pending packet number, a previous pending packet number, and a priority pending packet number, wherein the thread is to be executed by the processor to perform a transfer of the packets of data between the two devices, the previous pending packet number represents a number of packets of data that previously remained to be transferred between the two devices, and the priority pending packet number corresponds to the current priority of the thread; and
adjusting or maintaining, by the processor, the priority of the thread based on an outcome of the determining.

2. The method of claim 1, wherein determining whether to adjust the priority of the thread comprises:
comparing the current pending packet number with the previous pending packet number;
comparing the current pending packet number with the priority pending packet number; and
determining to adjust the priority of the thread when the current pending packet number is greater than or less than the previous pending packet number, and the current pending packet number is greater than or less than the priority pending packet number.

3. The method of claim 1, wherein adjusting or maintaining the priority of the thread comprises:
upgrading the priority of the thread when the current pending packet number is greater than the previous pending packet number and the current pending packet number is greater than the priority pending packet number;
degrading the priority of the thread when the current pending packet number is less than the previous pending packet number and the current pending packet number is less than the priority pending packet number; and
maintaining the priority of the thread otherwise.

4. The method of claim 1, wherein the two devices are peer-to-peer (P2P) devices, the priority pending packet number is a value stored in a pending packet number array at an index associated with the thread, and values stored in the pending packet number array are defined according to different configurations of one of the two P2P devices.

5. The method of claim 4, wherein adjusting the priority of the thread comprises:
adjusting the index associated with the thread; and
setting the priority of the thread to a value stored in a thread priority array at the index associated with the thread, values stored in the thread priority array being defined according to different configurations of the one of the two P2P devices.

6. The method of claim 1, wherein adjusting the priority of the thread comprises:
adjusting the priority of the thread based on a step representing an amount of adjustment to apply to the priority of the thread, the step being user defined.

7. The method of claim 6, further comprising:
determining that the adjusting of the priority of the thread is consistent with a previous adjustment of the priority of the thread; and
repeating the adjusting of the priority of the thread based on the step.

8. An apparatus, comprising:
a high speed interface; and
a processor coupled with the high speed interface, the processor configured to:
receive a current pending packet number representing a number of packets of data that currently remain to be transferred between two devices;
determine whether to adjust a priority of a thread based on the current pending packet number, a previous pending packet number, and a priority pending packet number, wherein the thread is to be executed by the processor to perform a transfer of the packets of data between the two devices, the previous pending packet number represents a number of packets of data that previously remained to be transferred between the two devices, and the priority pending packet number corresponds to the current priority of the thread; and
adjust or maintain the priority of the thread based on an outcome of the determination.

9. The apparatus of claim 8, wherein the processor is configured to:
compare the current pending packet number with the previous pending packet number;
compare the current pending packet number with the priority pending packet number; and
determine to adjust the priority of the thread when the current pending packet number is greater than or less than the previous pending packet number, and the current pending packet number is greater than or less than the priority pending packet number.

10. The apparatus of claim 8, wherein the processor is configured to:
upgrade the priority of the thread when the current pending packet number is greater than the previous pending packet number and the current pending packet number is greater than the priority pending packet number;
degrade the priority of the thread when the current pending packet number is less than the previous pending packet number and the current pending packet number is less than the priority pending packet number; and
maintain the priority of the thread otherwise.

11. The apparatus of claim 8, wherein the two devices are peer-to-peer (P2P) devices, the priority pending packet number is a value stored in a pending packet number array at an index associated with the thread, and values stored in the pending packet number array are defined according to different configurations of one of the two P2P devices.

12. The apparatus of claim 11, wherein the processor is configured to:
adjust the index associated with the thread; and
set the priority of the thread to a value stored in a thread priority array at the index associated with the thread, values stored in the thread priority array being defined according to different configurations of the one of the two P2P devices.

13. The apparatus of claim 8, wherein the processor is configured to:
adjust the priority of the thread based on a step representing an amount of adjustment to apply to the priority of the thread, the step being user defined.

14. The apparatus of claim 13, wherein the processor is configured to:
determine that the adjusting of the priority of the thread is consistent with a previous adjustment of the priority of the thread; and
repeat the adjusting of the priority of the thread based on the step.

15. A system, comprising:
a first device;
a second device;
a high speed interface coupling the first device with the second device; and
a processor coupled to the second device, the processor configured to:
receive a current pending packet number representing a number of packets of data that currently remain to be transferred between the first and the second devices;
determine whether to adjust a priority of a thread based on the current pending packet number, a previous pending packet number, and a priority pending packet number, wherein the thread is to be executed by the processor to perform a transfer of the packets of data between the first and the second devices, the previous pending packet number represents a number of packets of data that previously remained to be transferred between the first and the second devices, and the priority pending packet number corresponds to the current priority of the thread; and
adjust or maintain the priority of the thread based on an outcome of the determination.

16. The system of claim 15, wherein the processor is configured to:
compare the current pending packet number with the previous pending packet number;
compare the current pending packet number with the priority pending packet number; and
determine to adjust the priority of the thread when the current pending packet number is greater than or less than the previous pending packet number, and the current pending packet number is greater than or less than the priority pending packet number.

17. The system of claim 15, wherein the processor is configured to:
upgrade the priority of the thread when the current pending packet number is greater than the previous pending packet number and the current pending packet number is greater than the priority pending packet number;
degrade the priority of the thread when the current pending packet number is less than the previous pending packet number and the current pending packet number is less than the priority pending packet number; and
maintain the priority of the thread otherwise.

18. The system of claim 15, wherein the high speed interface couples the first device with the second device in a peer-to-peer (P2P) configuration, the priority pending packet number is a value stored in a pending packet number array at an index associated with the thread, and values stored in the pending packet number array are defined according to different configurations of the second device.

19. The system of claim 18, wherein the processor is configured to:
adjust the index associated with the thread; and set the priority of the thread to a value stored in a thread priority array at the index associated with the thread, values stored in the thread priority array being defined according to different configurations of the second device.

20. The system of claim 15, wherein the processor is configured to:
adjust the priority of the thread based on a step representing an amount of adjustment to apply to the priority of the thread, the step being user defined.

21. The system of claim 20, wherein the processor is configured to:
determine that the adjusting of the priority of the thread is consistent with a previous adjustment of the priority of the thread; and
repeat the adjusting of the priority of the thread based on the step.

* * * * *